(12) United States Patent
Lee et al.

(10) Patent No.: US 12,512,496 B2
(45) Date of Patent: Dec. 30, 2025

(54) SYSTEM AND METHOD FOR CALIBRATING OFFSET OF PRESSURE SENSOR FOR FUEL CELL

(71) Applicants: HYUNDAI MOTOR COMPANY, Seoul (KR); KIA CORPORATION, Seoul (KR)

(72) Inventors: Seung Hwan Lee, Jeongeup-si (KR); Seon Hak Kim, Yongin-si (KR); Seong Cheol Jeong, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 721 days.

(21) Appl. No.: 17/893,320

(22) Filed: Aug. 23, 2022

(65) Prior Publication Data

US 2023/0268534 A1 Aug. 24, 2023

(30) Foreign Application Priority Data

Feb. 24, 2022 (KR) .......................... 10-2022-0024439

(51) Int. Cl.
| | |
|---|---|
| H01M 8/04858 | (2016.01) |
| B60L 58/40 | (2019.01) |
| H01M 8/04228 | (2016.01) |
| H01M 8/0438 | (2016.01) |
| H01M 8/04537 | (2016.01) |

(Continued)

(52) U.S. Cl.
CPC ........... *H01M 8/0494* (2013.01); *B60L 58/40* (2019.02); *H01M 8/04228* (2016.02); *H01M 8/04425* (2013.01); *H01M 8/04619* (2013.01); *H01M 8/04753* (2013.01); *H01M 8/04947* (2013.01); *H01M 8/04955* (2013.01)

(58) Field of Classification Search
CPC ......... H01M 8/04425; H01M 8/04619; H01M 8/04753; H01M 8/04858; H01M 8/0494
See application file for complete search history.

(56) References Cited

U.S. PATENT DOCUMENTS

| | | | | |
|---|---|---|---|---|
| 11,757,113 B2 * | 9/2023 | Jeong | ................. | H01M 8/04753 |
| | | | | 429/429 |
| 2018/0292284 A1 * | 10/2018 | Kim | .................. | H01M 8/04388 |

FOREIGN PATENT DOCUMENTS

| | | | |
|---|---|---|---|
| JP | 2011204411 A | * | 10/2011 |
| JP | 2020149773 A | * | 9/2020 |

(Continued)

*Primary Examiner* — Amanda C. Walke
(74) *Attorney, Agent, or Firm* — MCDONNELL BOEHNEN HULBERT & BERGHOFF LLP (57) ABSTRACT

A system and method for calibrating an offset of a pressure sensor for a fuel cell including one or more fuel cell modules in which power generation is individually controlled by independently supplying hydrogen or air to a fuel cell stack includes a pressure sensor to sense a pressure of the hydrogen supplied to the fuel cell stack, a monitoring unit which monitors whether offset calibration of the pressure sensor of the one or more fuel cell modules is required, a power generation control unit which individually controls the one or more fuel cell modules to continue or stop power generation, and a calibration control unit which calibrates the offset of the pressure sensor of the fuel cell module in a state where power generation is stopped based on a preset offset calibration period or the monitoring of the monitor unit as to whether calibration is required.

18 Claims, 8 Drawing Sheets

(51) Int. Cl.
*H01M 8/04746* (2016.01)
*H01M 8/04955* (2016.01)

(56) References Cited

FOREIGN PATENT DOCUMENTS

KR     2021-0129982 A     10/2021
WO     WO-2020240043 A1 *     12/2020     ......... F02M 21/0218

* cited by examiner

| module 1 | module 2 | module 3 | module 4 |
|---|---|---|---|
| sensor 1 offset: 3.30kPa | sensor 1 offset: -3.25kPa | sensor 1 offset: 4.25kPa | sensor 1 offset: -0.25kPa |
| sensor 2 offset: 3.50kPa | sensor 2 offset: -3.55kPa | sensor 2 offset: 4.55kPa | sensor 2 offset: -0.75kPa |

① offset size per module: 3.40kPa, 3.40kPa, 4.40kPa, 0.50kPa

② system offset average = (3.40 + 3.40 + 4.40 + 0.50) / 4 = 2.925kPa

Abs(① − ②) [absolute value]: 0.475kPa, 0.475kPa, 1.475kPa, 2.425kPa offset calibration priority : 3, 4, 2, 1

FIG. 8

SYSTEM AND METHOD FOR CALIBRATING OFFSET OF PRESSURE SENSOR FOR FUEL CELL

CROSS REFERENCE TO RELATED APPLICATIONS

The present application claims priority to Korean Patent Application No. 10-2022-0024439, filed Feb. 24, 2022, the entire contents of which is incorporated herein for all purposes by this reference.

BACKGROUND

Field

The present disclosure relates to a system and method for calibrating an offset of a pressure sensor for a fuel cell, and more particularly, to a control scheduling of a fuel cell for power generation for calibrating an offset of a pressure sensor sensing the pressure of hydrogen supplied to the fuel cell.

Description of the Related Art

A fuel cell is a type of power generation device that directly converts chemical energy generated by oxidation of fuel into electrical energy. It is basically the same as a chemical cell in that it uses oxidation and reduction reactions, but unlike a chemical cell in which a cell reaction occurs in a closed system, in the fuel cell, reactants are continuously supplied from an outside, and reaction products are continuously removed to the outside of a system. Recently, a fuel cell power generation system has been put to practical use, and since the reaction product of the fuel cell is pure water, research for using it as an energy source for an eco-friendly vehicle is being actively conducted.

A fuel cell system includes a fuel cell stack that generates electric energy through a chemical reaction, an air supply device that supplies air to an air electrode of the fuel cell stack, and a fuel supply device that supplies hydrogen to a hydrogen electrode of the fuel cell stack. That is, air containing oxygen is supplied to the cathode of the fuel cell stack, and hydrogen is supplied to the anode of the fuel cell stack.

A proton exchange membrane/polymer electrolyte membrane fuel cell generates electricity through a chemical reaction of oxygen and hydrogen and additionally generates heat and water. The chemical reaction formula of the polymer electrolyte membrane fuel cell is as follows.

Hydrogen ($H_2$) + Oxygen ($O_2$) ⇌ Water ($H_2O$) + Electricity + Heat

Fuel cell systems for power generation can be installed in various sizes to supply electricity and heat. In general, a fuel cell for power generation refers to a fuel cell that has an output of 25 KW or more and is operated in a device type. A fuel cell for power generation uses a plurality of fuel cell systems, such as a fuel cell for a vehicle, and operates for a relatively long time without shutdown because a demand output is always generated.

In the case of fuel cells for vehicles, offset calibration of the hydrogen pressure sensor was possible during frequent shutdown or ignition off. However, in the case of fuel cells for power generation, it was difficult to calibrate the offset of the hydrogen pressure sensor, and there was a problem in that it was difficult to secure the durability of the fuel cell stack due to the offset generated.

The matters described as the background art above are only for improving the understanding of the background of the present disclosure, and should not be taken as acknowledging that they correspond to the prior art already known to those of ordinary skill in the art.

SUMMARY

In order to achieve the above object, the present disclosure is to provide a system and method for calibrating an offset of a pressure sensor for a fuel cell.

In order to achieve the above object, a system for calibrating an offset of a pressure sensor for a fuel cell according to the present disclosure includes one or more fuel cell modules in which power generation is individually controlled by independently supplying hydrogen or air to a fuel cell stack, and which includes a pressure sensor to sense a pressure of the hydrogen supplied to the fuel cell stack, a monitoring unit which monitors whether offset calibration of the pressure sensor of the one or more fuel cell modules is required, a power generation control unit which individually controls the one or more fuel cell modules to continue or stop power generation, and a calibration control unit which calibrates the offset of the pressure sensor of the fuel cell module in a state where power generation is stopped based on a preset offset calibration period or the monitoring of the monitor unit as to whether calibration is required.

The monitoring unit may monitor whether the calibration of the pressure sensor is required based on an output value of the pressure sensor or a power generation state of the fuel cell stack.

The pressure sensor included in each of the one or more fuel cell modules is provided with a plurality of sensors, and the monitoring unit may determine that the calibration of the pressure sensor is required if an error between output values from the plurality of sensors included in the pressure sensor is greater than or equal to a preset error.

The monitoring unit may determine that the calibration of the pressure sensor is required if a ratio of a minimum cell voltage to an average cell voltage of the fuel cell stack is less than or equal to a predetermined ratio.

The power generation unit may stop the power generation of the fuel cell module determined to require the calibration of the pressure sensor by the monitoring unit, and the calibration control unit may calibrate the offset of the pressure sensor of the fuel cell module in which power generation is stopped in the power generation control unit.

Each of the one or more fuel cell modules includes a low voltage battery which is charged to store a generated power of the fuel cell stack or discharged to supplement the generated power of the fuel cell stack, the power generation control unit may charge the low voltage battery included in the fuel cell module, which is determined to require the calibration of the pressure sensor by the monitoring unit, to a preset first required charge amount based on a power consumption in a state where the power generation of the fuel cell module is stopped and an amount of power required for restart, and then stop the power generation of the fuel cell module determined to require the calibration of the pressure sensor by the monitoring unit.

The system further includes a high voltage battery which stores a power output from the one or more fuel cell modules or is discharged to supplement the power output from the one or more fuel cell module, the power generation control unit may charge the high voltage battery to a preset second required charge amount based on a number of the fuel cell module determined to require the calibration of the pressure senor by the monitoring unit, and then control to stop the power generation of the fuel cell module determined to require the calibration of the pressure sensor by the monitoring unit.

The monitoring unit may set an offset calibration sequence of the pressure sensor based on a deviation from an average value of an offset size of the pressure sensor included in the one or more fuel cell modules, the power generation control unit may control to sequentially stop the power generation of the fuel cell module determined to require the calibration of the pressure sensor according to the sequence set by the monitoring unit.

In order to achieve the above objection, a method for calibrating an offset of a pressure sensor for a fuel cell according to the present disclosure includes the steps of monitoring whether an offset calibration of a pressure sensor included in one or more fuel cell modules for sensing a pressure of hydrogen supplied to a fuel cell stack is required, wherein the one or more fuel cell modules independently supply the hydrogen or air to the fuel cell stack so that power generation is individually controlled, individually controlling the one or more fuel cell modules to continue or stop the power generation, and calibrating the offset of the pressure sensor of the fuel cell module in a state where the power generation is stopped based on a preset offset calibration period or whether the calibration is required in the monitoring step.

In the monitoring step, whether the calibration of the pressure sensor is urgently required may be monitored based on an output value of the pressure sensor or a power generation state of the fuel cell stack.

In the monitoring step, it may be determined that the calibration of the pressure sensor is required if an error between output values from a plurality of sensors included in the pressure sensor included in each of the one or more fuel cell modules is greater than or equal to a preset error.

In the monitoring step, it may be determined that the calibration of the pressure sensor is required if a ratio of a minimum cell voltage to an average cell voltage of the fuel cell stack is less than or equal to a predetermined ratio.

In the controlling step, the power generation of the fuel cell module determined to require the calibration of the pressure sensor in the monitoring step may stopped, and in the calibrating step, the offset of the pressure sensor of the fuel cell module in which power generation is stopped in the controlling step may be calibrated.

Each of the one or more fuel cell modules includes a low voltage battery which is charged to store a generated power of the fuel cell stack or discharged to supplement the generated power of the fuel cell stack, in the controlling step, the low voltage battery included in the fuel cell module, which is determined to require the calibration of the pressure sensor in the monitoring step, may be charged to a preset first required charge amount based on a power consumption in a state where the power generation of the fuel cell module is stopped and an amount of power required for restart, and then the power generation of the fuel cell module determined to require the calibration of the pressure sensor in the monitoring step may be controlled to be stopped.

In the controlling step, a high voltage battery, which stores a power output from the one or more fuel cell modules or is discharged to supplement the power output from the one or more fuel cell module, may be charged to a preset second required charge amount based on a number of the fuel cell module determined to require the calibration of the pressure senor in the monitoring step, and then the power generation of the fuel cell module determined to require the calibration of the pressure sensor in the monitoring unit may be controlled to be stopped.

The method may further include, before the controlling step, the step of setting an offset calibration sequence of the pressure sensor based on a deviation from an average value of an offset size of the pressure sensor included in the one or more fuel cell modules, in the controlling step, the power generation of the fuel cell module determined to require the calibration of the pressure sensor may be controlled to be sequentially stopped according to the sequence set in the setting step.

According to the system and method for calibrating the offset of a pressure sensor for a fuel cell of the present disclosure, an error between an output value according to the sensing of the pressure sensor and an actual value of the pressure is minimized, and accordingly, the accuracy of controlling the hydrogen pressure supplied to the fuel cell stack can be secured.

DETAILED DESCRIPTION

Specific structural or functional descriptions of the embodiments of the present disclosure disclosed in the present specification or application are only exemplified for the purpose of describing the embodiments according to the present disclosure, and the embodiments according to the present disclosure may be implemented in various forms and should not be construed as being limited to the embodiments described in the present specification or application.

Since the embodiment according to the present disclosure can have various changes and can have various forms, specific embodiments are illustrated in the drawings and described in detail in the present specification or application. However, this is not intended to limit the embodiment according to the concept of the present disclosure with respect to a specific disclosed form, and should be understood to include all changes, equivalents or substitutes included in the spirit and technical scope of the present disclosure.

Terms such as first and/or second may be used to describe various elements, but the elements should not be limited by the terms. The above terms are used only for the purpose of distinguishing one element from another element, for example, without departing from the scope of the present disclosure, a first element may be called a second element, and similarly the second component may also be referred to as the first component.

When an element is referred to as being "connected" or "contacted" to another element, it may be directly connected or contacted to the other element, but it should be understood that other elements may exist in between. On the other hand, when it is mentioned that a certain element is "directly connected" or "directly contacted" to another element, it should be understood that no other element is present in the middle. Other expressions describing the relationship between elements, such as "between" and "immediately between" or "neighboring to" and "directly adjacent to", etc., should be interpreted similarly.

The terms used herein are used only to describe specific embodiments, and are not intended to limit the present disclosure. The singular expression includes the plural expression unless the context clearly dictates otherwise. In this specification, terms such as "comprise" or "have" are intended to designate that the described feature, number, step, operation, element, part, or a combination thereof exists, and should be understood that it does not preclude the existence or addition of one or more other features, numbers, steps, operations, elements, parts, or combinations thereof.

Unless defined otherwise, all terms used herein, including technical and scientific terms, have the same meaning as commonly understood by one of ordinary skill in the art to which this disclosure belongs. Terms such as those defined in commonly used dictionaries should be interpreted as having meanings consistent with the context of the related art, and unless explicitly defined in the present specification, they are not to be interpreted in an ideal or excessively formal meaning.

Hereinafter, the present disclosure will be described in detail by describing preferred embodiments of the present disclosure with reference to the accompanying drawings. Like reference numerals in each figure indicate like elements.

Figure 1:
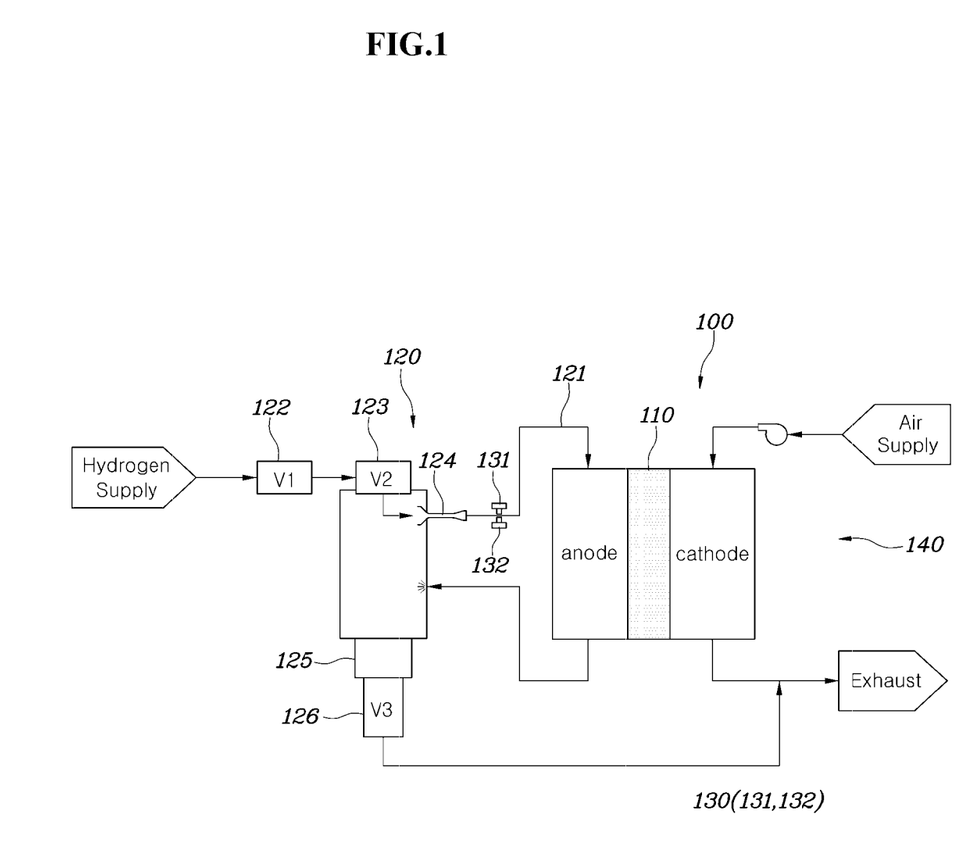
FIG. 1 is a configuration diagram showing a fuel cell module according to an embodiment of the present disclosure.
Figure 2:
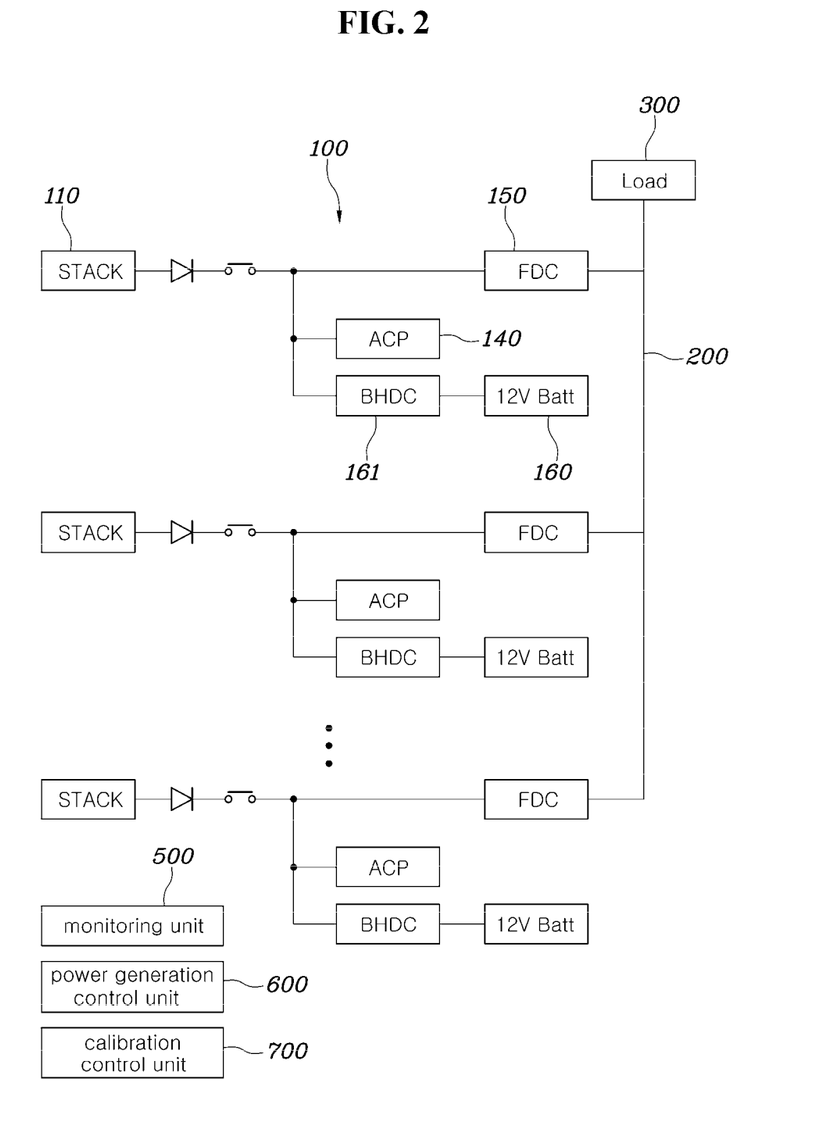
FIGS. 2 and 3 are configuration diagrams of an offset calibration system of a pressure sensor for a fuel cell according to various embodiments of the present disclosure.
Figure 3:
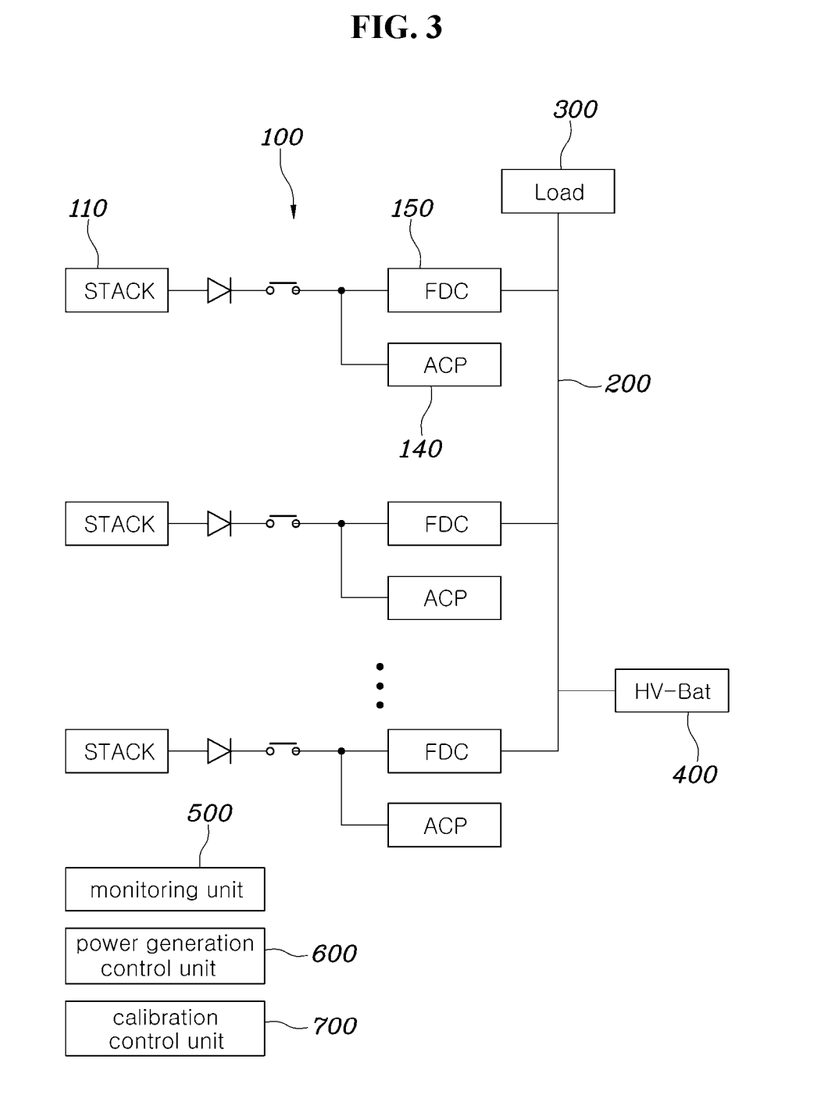

FIG. 1 is a configuration diagram showing a fuel cell module 100 according to an embodiment of the present disclosure, FIGS. 2 to 3 are configuration diagrams of an offset calibration system of a pressure sensor 130 for a fuel cell according to various embodiments of the present disclosure.

Referring to FIGS. 1 to 3, a system for calibrating an offset of a pressure sensor 130 for a fuel cell according to an embodiment of the present disclosure includes one or more fuel cell modules 100 in which power generation is individually controlled by independently supplying hydrogen or air to a fuel cell stack 110, and which includes the pressure sensor 130 to sense a pressure of the hydrogen supplied to the fuel cell stack 110. The system further includes a monitoring unit 500 which monitors whether offset calibration of the pressure sensor 130 of the one or more fuel cell modules 100 is required, a power generation control unit 600 which individually controls the one or more fuel cell modules 100 to continue or stop power generation, and a calibration control unit 700 which calibrates the offset of the pressure sensor 130 of the fuel cell module 100 in a state where the power generation is stopped based on a preset offset calibration period or the monitoring of the monitor unit 500 as to whether calibration is required.

The one or more fuel cell modules 100 according to an embodiment of the present disclosure may be one or a plurality of fuel cell modules 100, and one or a plurality of fuel cell stacks 110 may be included in one fuel cell module 100.

The fuel cell stack 110 may be configured by stacking a plurality of unit cells, and each cell included in the fuel cell stack 110 receives hydrogen through an anode and air containing oxygen through a cathode to generate electricity.

The fuel cell stack 110 may include a membrane electrode assembly (MEA) therein.

Each fuel cell module 100 independently supplies hydrogen or air to the fuel cell stack 110 so that the power generation is individually controlled. As shown, an air supply device or air compressor (ACP) 140 and a hydrogen supply device 120 may be individually employed to each fuel cell module 100.

The air supply device 140 may be a device for respectively supplying the air containing oxygen to a plurality of unit cells included in the fuel cell. In particular, the air supply device 140 may selectively supply air to the fuel cell. More specifically, the air supply device 140 may stop supplying air in a state where power generation of the fuel cell is stopped (FC Stop), and may supply air only in a state where electric power is generated by the fuel cell. In addition, the air supply unit 140 may control the amount of air supplied to the fuel cell in the states of upper voltage limit control and low flow rate control of the fuel cell.

The air supply device 140 includes an externally connected air supply line and an air blower or an air compressor for flowing air, and may further include a pressure control valve provided in the air exhaust line.

The hydrogen supply device 120 may be a device that supplies hydrogen to a plurality of unit cells included in the fuel cell, respectively. In particular, the hydrogen supply device 120 may continuously supply hydrogen to the fuel cell. In one embodiment, the hydrogen supply device 120 may be configured to include a recirculation line 121 to recirculate the gas containing hydrogen to the anode of the fuel cell, a hydrogen supply line to supply hydrogen to the recirculation line 121 and an ejector 124 provided between the recirculation line 121 and a storage tank to generate recirculation power.

A hydrogen shutoff valve 122 and a hydrogen supply valve 123 may be provided between the hydrogen supply line and the recirculation line 121. Here, the hydrogen shutoff valve 122 may control whether hydrogen is supplied in an On/Off shutoff method, and the hydrogen supply valve 123 may control the amount of hydrogen supplied in a duty control method.

In addition, the recirculation line 121 may be provided with a pressure sensor 130 to sense the pressure of the gas containing hydrogen therein. The hydrogen supply valve 123 may control the amount of hydrogen supplied from the hydrogen supply line based on the pressure sensed by the pressure sensor 130. For stability of control, the pressure sensor 130 may include a plurality of pressure sensors 131 and 132.

In another embodiment, an integrated air supply device 140 and hydrogen supply device 120 for respectively supplying air and hydrogen to the one or more fuel cell modules 100 may be provided, and each of the fuel cell modules 100 may be provided with a valve for controlling the supply amount of air and hydrogen supplied from the integrated air supply device 140 and hydrogen supply device 120.

The load device 300 is a power consumption device electrically connected to the fuel cell, and may receive the power generated from the fuel cell stack 110. In particular, the load device 300 may receive most of demand powers from the fuel cell, and the battery 130 (low voltage battery (160) or high voltage battery (400)) may supplement insufficient power or store surplus power as an energy buffer.

In one embodiment, when the fuel cell system is mounted on a vehicle, the load device 300 may be a driving motor of the vehicle, an air supply device 140 such as an air blower or an air compressor that supplies air to the fuel cell stack 110, a cooling pump that supplies coolant for cooling the fuel cell stack 110, or a power consumption device such as a COD resistor.

In another embodiment, when the fuel cell system is used for power generation, the load device 300 may be a mechanical device in a factory or a power consumption device in a building.

The one or more fuel cell modules 100 are respectively connected to the load device 300 through a main bus terminal 200, and each of the fuel cell modules 100 is provided with a converter 150 to convert the power of the fuel cell stack 110 included in the fuel cell module 100 to provide the converted power to the main bust terminal 200.

The monitoring unit 500, the power generation control unit 600 and the calibration control unit 700 according to an exemplary embodiment of the present disclosure may be implemented through a non-volatile memory (not shown) configured to store data relating to an algorithm configured to control the operations of various components of a vehicle or software instructions for reproducing the algorithm, and a processor (not shown) configured to perform the operations described below using the data stored in the corresponding memory. Here, the memory and the processor may be implemented as separate chips. Alternatively, the memory and processor may be implemented as a single chip integrated with each other. The processor may take the form of one or more processors.

The monitoring unit 500 may determine whether the offset calibration of the pressure sensor 130 of the one or more fuel cell modules 100 is required. The pressure sensor 130 may add the offset to the sensing value of the pressure sensor 130 and output it as the pressure of hydrogen supplied to the fuel cell stack 110. These offsets may need to be calibrated periodically or when errors occur.

The power generation control unit 600 may individually continue to generate power or control the stop of the power generation for the one or more fuel cell modules 100. In one embodiment, the power generation control unit 600 may control the air supply device 140 included in each of the one or more fuel cell modules 100 to stop the air supply to the fuel cell stack 110 to stop power generation, or to maintain the air supply to the fuel cell stack 110 to continue the power generation.

In addition, the power generation control unit 600 may stop the power generation of some or all of the one or more fuel cell modules 100 according to the demand power of the load device 300. For example, when the demand power of the load device 300 is large, the power generation control unit 600 may control all of the one or more fuel cell modules 100 to generate power, and when the demand power is decreased, the power generation control unit 600 may control some of the one or more fuel cell modules 100 to stop power generation. In particular, the power generation control unit 600 may select the fuel cell module 100 for which power generation is to be stopped based on the duration of power generation of the one or more fuel cell modules 100.

In particular, the power generation control unit may stop the power generation of the fuel cell module 100 determined to require offset calibration by the monitoring unit 500 before the calibration control unit 700 calibrates the offset of the pressure sensor 130.

In the case of the fuel cell system employed to a vehicle, not only shut down but also temporary stop (idle FC stop) due to battery charging, decrease in demand power and the like frequently occur, so an active stop of power generation may not be required.

However, since the fuel cell system for power generation requires a relatively long operation, active power generation control of the power generation control unit 600 may be required to calibrate the offset of the pressure sensor 130.

The calibration control unit 700 may calibrate the offset of the pressure sensor 130 of the fuel cell module 100 in a state where the power generation is stopped according to a preset offset calibration period, or may calibrate the offset of the pressure sensor 130 after stopping the power generation of the fuel cell modules 100 determined to require calibration based on the monitoring of the monitor unit 500 as to whether calibration is required.

More specifically, in the case of calibrating the offset of the pressure sensor 130 according to a preset offset calibration period, the calibration control unit 700 may calibrate the offset of the pressure sensor 130 when the power generation of the fuel cell module 100 is stopped according to a general manual calibration. The preset offset calibration period may be preset to, for example, four hundred (400) hours.

However, when it is determined that calibration is required based on the monitoring of the monitoring unit 500 as to whether calibration is required, the power generation of the fuel cell module 100 is stopped according to an urgent active calibration and the offset of the pressure sensor 130 can be calibrated.

Figure 4:
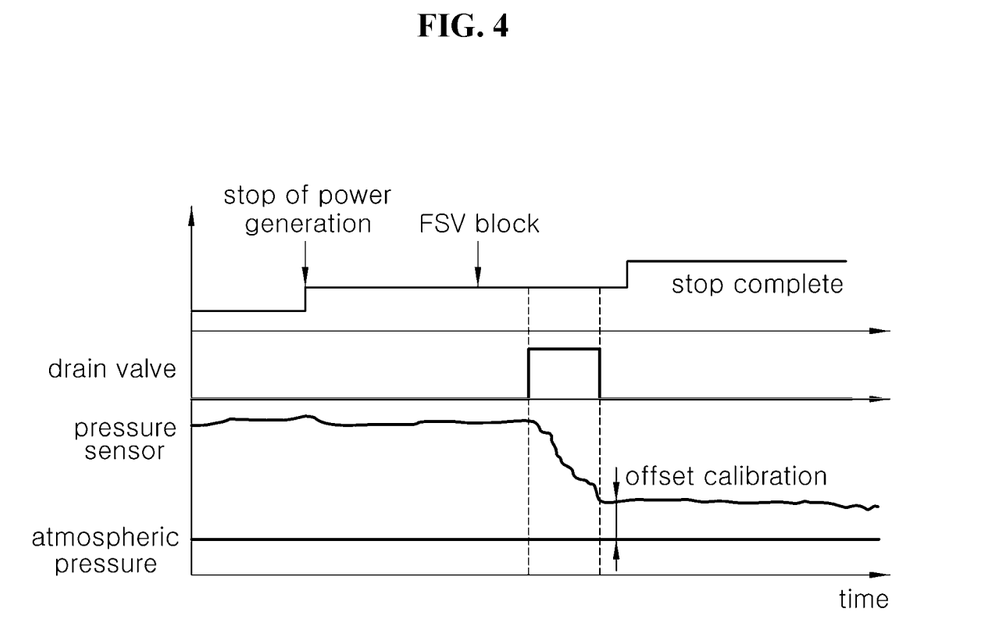
FIG. 4 is a diagram showing an offset calibration sequence of a pressure sensor according to an embodiment of the present disclosure.

FIG. 4 is a diagram showing an offset calibration sequence of the pressure sensor 130 according to an embodiment of the present disclosure.

Referring further to FIG. 4, the offset of the pressure sensor 130 may be calibrated while the pressure sensor 130 is exposed to atmospheric pressure.

First, the power generation control unit 600 may stop the power generation of the fuel cell module 100, and the calibration control unit 700 may open a drain valve 126 while the hydrogen supply valve 123 is blocked, in a state where the power generation of the fuel cell module 100 is stopped.

Specifically, the recirculation line 121 of the fuel cell module 100 includes the drain valve 126 for discharging the gas containing hydrogen therein to an outside. When the drain valve 126 is opened, the gas of the recirculation line 121 may be discharged to the atmosphere after discharging the moisture stored in a water trap 125 to the outside. The calibration control unit 700 may expose the pressure sensor 130 to atmospheric pressure by opening the drain valve 126.

After the drain valve 126 is opened for a preset waiting time or until the pressure change of the pressure sensor 130 becomes small, the offset may be calibrated so that the output value sensed by the pressure sensor 130 is equal to atmospheric pressure. The atmospheric pressure may be sensed by a separate atmospheric pressure sensor, input from the outside, or used as a preset atmospheric pressure. Thereafter, the power generation control unit 600 may complete shutdown control of the fuel cell module 100.

Accordingly, the error between the output value according to the sensing of the pressure sensor 130 and the actual value of the pressure is minimized, and accordingly, the accuracy of the control of the hydrogen pressure supplied to the fuel cell stack 110 can be secured.

The monitoring unit 500 may monitor whether the calibration of the pressure sensor 130 is required based on the output value of the pressure sensor 130 or the power generation state of the fuel cell stack 110.

In one embodiment, the pressure sensor 130 included in each of the fuel cell modules 100 is provided with a plurality of sensors, and the monitoring unit 500 may determine that calibration of the pressure sensor 130 is required if an error between the output values from the plurality of sensors included in the pressure sensor 130 is greater than or equal to a preset error.

The pressure sensor 130 included in each of the fuel cell modules 100 may include a first sensor and a second sensor. The pressure of the gas containing hydrogen supplied to the fuel cell stack 110 through the recirculation line 121 may use an average value of the output value of the first sensor and the output value of the second sensor. Accordingly, robustness against pressure control of hydrogen supplied to the fuel cell stack 110 may be secured.

If the error between the output values sensed by the first sensor and the second sensor included in the pressure sensor 130, respectively, and an offset is added thereto is greater than or equal to a preset error, the monitoring unit 500 may determine that the calibration of the pressure sensor 130 is required. In particular, when one minute average value of the error between the output values of the first sensor and the second sensor is 4 [kPa] or more, it may be determined that the offset calibration of the pressure sensor 130 is required.

In another embodiment, the monitoring unit 500 may determine that the calibration of the pressure sensor 130 is required when a ratio of a minimum cell voltage to an average cell voltage of the fuel cell stack 110 is less than or equal to a preset ratio.

Here, the minimum cell voltage refers to a minimum value among the voltage values sensed with respect to a plurality of unit cells constituting the fuel cell stack 110 included in the fuel cell module 100. The average cell voltage may be an average of the sensed voltage values of unit cells or a value obtained by dividing the output voltage of the fuel cell stack 110 by the number of unit cells.

The power generation control unit 600 may control to stop the power generation of the fuel cell module 100, which is determined to require the calibration of the pressure sensor 130 by the monitoring unit 500. The calibration control unit 700 may calibrate the offset of the pressure sensor 130 of the fuel cell module 100 in which the power generation is stopped by the power generation control unit 600.

That is, when it is required to quickly calibrate the offset of the pressure sensor 130, the power generation of the fuel cell module 100 may be actively stopped and the offset of the pressure sensor 130 may be calibrated.

Figure 5:
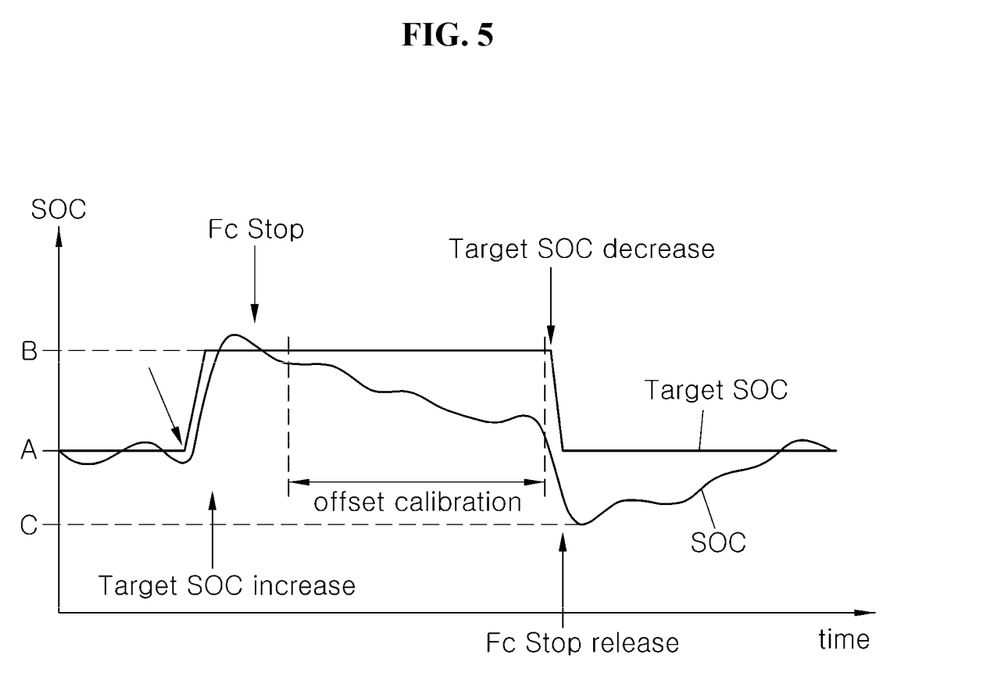
FIG. 5 shows SOC and target SOC of a high voltage battery according to the embodiment of FIG. 2.

FIG. 5 shows SOC and target SOC of a high voltage battery 400 according to the embodiment of FIG. 2.

Referring further to FIGS. 2 and 5, each of the one or more fuel cell modules 100 includes a low voltage battery 160 which is charged to store the generated power of the fuel cell stack 110 or discharged to supplement the generated power of the fuel cell stack 110. The power generation control unit 600 may charge the low voltage battery 160 included in the fuel cell module 100 determined to require calibration of the pressure sensor 130 by the monitoring unit 500 to a preset first required charge amount, based on a power consumption in a state where the power generation of the fuel cell module is stopped and the amount of power required for restart, and then, control the fuel cell module 100 determined to require the calibration of the pressure senor 130 by the monitoring unit 500 to stop the power generation.

In the BHDC type as shown in FIG. 2, the one or more fuel cell modules 100 are connected to the main bus terminal 200 through the converter 150, and each of the fuel cell modules 100 includes the low voltage battery 160 which is charged to store the generated power of the fuel cell stack 110 or discharged to supplement the generated power of the fuel cell stack 110. A bidirectional converter (bidirectional high-voltage DC/DC Converter) 161 may be provided between the fuel cell stack 110 and the low voltage battery 160.

The power generation control unit 600 may control to stop the power generation of the fuel cell module 100 after charging the low voltage battery 160 to a preset first required charge amount.

Here, the preset first required charge amount may be preset based on the power consumption in a state where the power generation of the fuel cell module 100 is stopped and the amount of power required for restart. In particular, the power generation control unit 600 may control the fuel cell stack 110 and the bidirectional converter 161 so that the charge amount of the low voltage battery 160 becomes the target SOC.

During normal operation of the fuel cell module 100, the target SOC of the low voltage battery 160 may be set to A, and the minimum SOC of the low voltage battery 160 may be set to C. The preset first required charge amount (B) for calibration of the pressure sensor 130 may be preset to be larger than the target SOC (A) of the low voltage battery 160 during normal operation.

In particular, the first required charge amount (B) may be set as a value obtained by adding the amount of power (an amount of driving power of the air supply device 140) required for restart to the product of the time required to calibrate the offset of the pressure sensor 130 to the minimum SOC (C) of the low voltage battery 160 and the power consumption (power consumed for auxiliary equipment and cooling) in a state where the power generation of the fuel cell module 100 is stopped.

Figure 6:
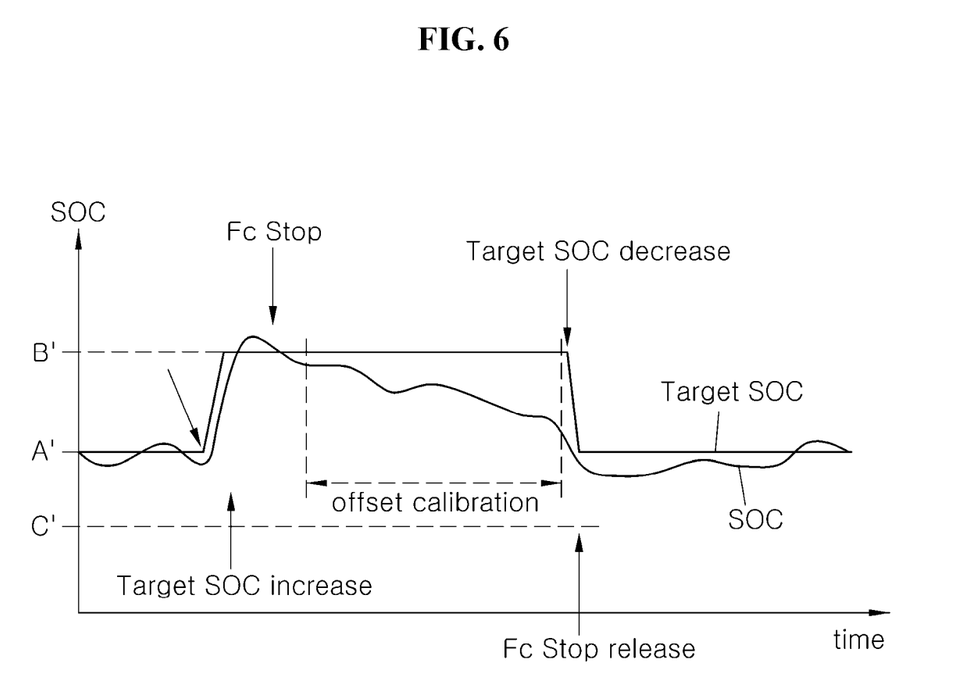
FIG. 6 shows SOC and target SOC of a high voltage battery according to the embodiment of FIG. 3.

FIG. 6 shows SOC and target SOC of the high voltage battery 400 according to the embodiment of FIG. 3.

Referring to FIGS. 3 and 6, the system further includes a high voltage battery 400 which is charged to store the power output from the one or more fuel cell modules 100 or discharged to supplement the power output from the one or more fuel cell modules 100. The power generation control unit 600 may charge the high voltage battery 400 to a preset second required charge amount based on the number of fuel cell modules 100 determined to require the calibration of the pressure sensor 130 by the monitoring unit 500, and then, control to stop the power generation of the fuel cell modules 100 determined to require the calibration of the pressure sensor 130 by the monitoring unit 300.

In the HV-Bat type as shown in FIG. 2, the one or more fuel cell modules 100 are connected to the main bus terminal 200, and the high voltage battery 400 which is charged to store the power output from the one or more fuel cell modules 100 or discharged to supplement the power output from the one or more fuel cell modules may be connected to the main bus terminal 200.

The power generation control unit 600 may control to stop the power generation of the fuel cell module 100 after charging the high voltage battery 400 to the preset second required charge amount.

During normal operation of the fuel cell module 100, the target SOC of the high voltage battery 400 may be set to A', and the minimum SOC of the high voltage battery 400 may be set to C'. The preset second required charge amount (B') for the calibration of the pressure sensor 130 may be preset to be larger than the target SOC (A') of the high voltage battery 400 during normal operation.

In particular, the second required charge amount (B') may be set as a sum of the product of the amount of power required for offset calibration of the pressure sensor 130 to the minimum SOC (C) of the high voltage battery 400 (the product of the time required for offset calibration of the pressure sensor 130 and the power consumption in a state where the power generation of the fuel cell module 100 is stopped) and the number of the fuel cell modules 100 determined to require the calibration of the pressure sensor 130.

Figure 7:
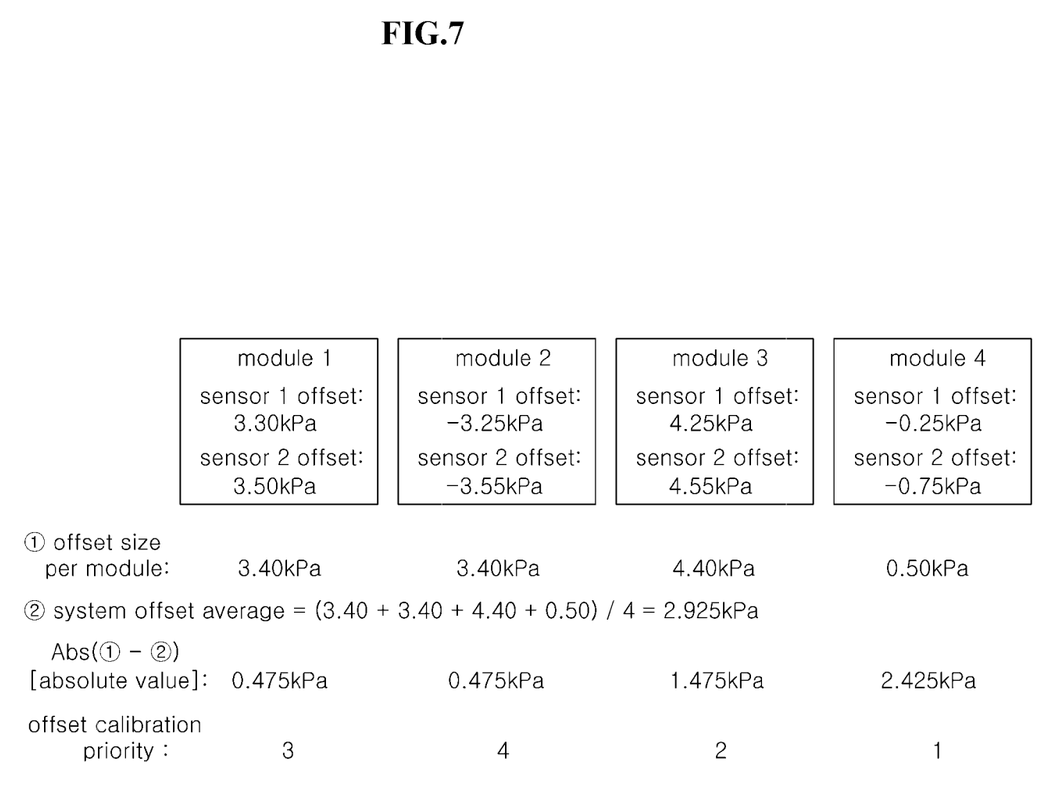
FIG. 7 shows a table for setting an offset calibration sequence of a pressure sensor according to an embodiment of the present disclosure.

FIG. 7 shows a table for setting an offset calibration sequence of the pressure sensor 130 according to an embodiment of the present disclosure.

Referring further to FIG. 7, the monitoring unit 500 determines the offset calibration sequence of the pressure sensor 130 based on a deviation from the average value of the offset size of the pressure sensor 130 included in the one or more fuel cell modules 100. The power generation control unit 600 may control to sequentially stop the power generation of the fuel cell module 100 determined to require the calibration of the pressure sensor 130 according to the sequence set by the monitoring unit 500.

Specifically, the monitoring unit 500 may calculate the average value of the offset size of the pressure sensor 130 included in each of the fuel cell modules 100. First, the monitoring unit 500 calculates the offset size of the pressure sensor 130. In particular, when the first sensor and the second sensor are included in the pressure sensor 130, the monitoring sensor 500 calculates an average value for each offset, and can calculate the absolute value of the calculated average value as the offset size (①) of the pressure sensor 130.

Also, the monitoring unit 500 may calculate an average value (②) of the offset sizes of the one or more fuel cell modules 100. Thereafter, the monitoring unit 500 may calculate a deviation between the offset size (①) of each fuel cell module 100 and the average value of the offset size (②), and set the offset calibration sequence of the pressure sensor 130 according to the size.

Among fuel cell modules 100 1 to 4, a module 4, which is a module with the largest deviation, may be set to have priority in offset calibration, and a module 3 with the next smallest deviation may be set to have the next priority.

In addition, the monitoring unit 500 may set the offset calibration sequence of the pressure sensor 130 according to whether the offset of the pressure sensor 130 is a positive number or a negative number (sign). Specifically, when the offset of the pressure sensor 130 is positive, the pressure of hydrogen supplied to the fuel cell stack 110 may be relatively lowered due to miscalibration, and thus, a greater problem in durability may occur.

Accordingly, the monitoring unit 500 may set the offset correction sequence of the pressure sensor 130 so that the pressure sensor 130 having a positive offset is preferentially calibrated. That is, among modules 1 and 2, in which the deviation between the offset size (①) of the fuel cell module 100 and the average value of the offset size (②) is the same, the monitoring unit 500 may preferentially perform the pressure calibration for the module 1 having a positive offset.

The power generation control unit 600 sequentially stops the power generation of the fuel cell module 100 according to the sequence set by the monitoring unit 500, and the calibration control unit 700 may calibrate the offset of the pressure sensor 130 in a state where power generation is stop, according to the sequence set by the monitoring unit 500.

In addition, the power generation control unit 600 sets the number of fuel cell modules 100 capable of stopping power generation based on the demand power of the load device 300, and may simultaneously stop the power generation of some of the one or more fuel cell modules 100 by a set number. Also, the calibration control unit 700 may calibrate the offset of the pressure sensor 130 included in the fuel cell module 100 in a state where power generation is stopped.

Figure 8:
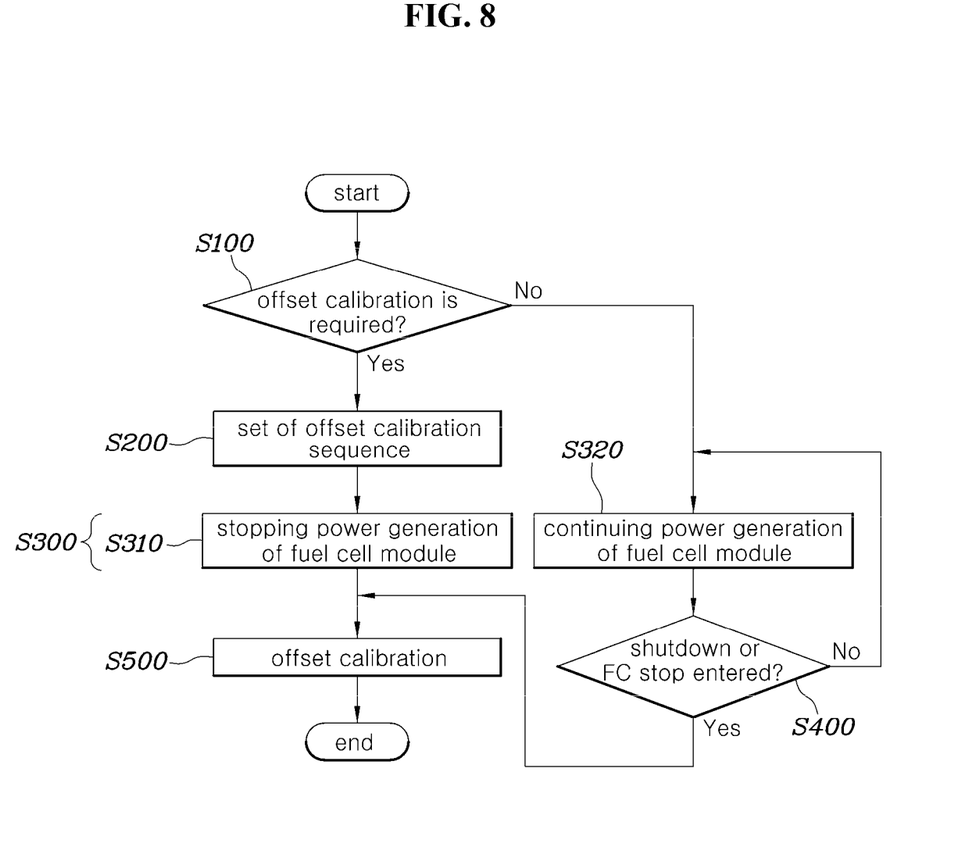
FIG. 8 is a flowchart of a method for calibrating an offset of a pressure sensor for a fuel cell according to an embodiment of the present disclosure.

FIG. 8 is a flowchart of a method for calibrating an offset of the pressure sensor 130 for a fuel cell according to an embodiment of the present disclosure.

Referring further to FIG. 8, a method for calibrating the offset of the pressure sensor 130 for a fuel cell according to an embodiment of the present disclosure includes the steps of monitoring whether the offset calibration of the pressure sensor 130 included in one or more fuel cell modules 100 for sensing a pressure of hydrogen supplied to the fuel cell stack 110 is required, where the one or more fuel cell modules 100 independently supply the hydrogen or air to the fuel cell stack 110 so that power generation is individually controlled at S100. The method further includes individually controlling the one or more fuel cell modules 100 to continue or stop the power generation at S300, and calibrating the offset of the pressure sensor 130 of the fuel cell modules 100 in a state where the power generation is stopped based on a preset offset calibration period or whether the calibration is required in the monitoring step at S500.

In the monitoring step S100, if it is not determined that the calibration of the pressure sensor 130 is required, the power generation of the fuel cell module 100 is continued at S320. When entering the shutdown or FC stop mode of the fuel cell modules 100, the offset of the pressure sensor 130 may be calibrated at S400.

In the monitoring step S100, it is possible to monitor whether the calibration of the pressure sensor 130 is required based on the output value of the pressure sensor 130 or the power generation state of the fuel cell stack 110.

In the monitoring step S100, if the error between the output values of the plurality of sensors provided in the pressure sensor 130 included in each fuel cell module 100 is greater than or equal to a preset error, it may be determined that the calibration of the pressure sensor 130 is required at S100.

In the monitoring step S100, when the ratio of the minimum cell voltage to the average cell voltage of the fuel cell stack 110 is less than or equal to a preset ratio, it may be determined that the calibration of the pressure sensor 130 is required.

In the controlling step S300, the power generation of the fuel cell module 100 determined to require the calibration of the pressure sensor 130 in the monitoring step is controlled to stop power generation. In the calibrating step S500, the offset of the pressure sensor 130 of the fuel cell module 100 in which power generation is stopped in the controlling step may be calibrated.

Each of the one or more fuel cell modules 100 includes the low voltage battery 160 which is charged to store the generated power of the fuel cell stack 110 or discharged to supplement the generated power of the fuel cell stack 110. In the controlling step S300, the low voltage battery 160 included in the fuel cell module 100 determined to require calibration of the pressure sensor 130 in the monitoring step, is charged to a preset first required charge amount based on the consumption power in a state where the power generation of the fuel cell module is stopped and the amount of power required for restart. Then, the fuel cell module 100 determined to require the calibration of the pressure sensor 130 in the monitoring step S100 may stop power generation at S310.

In the controlling step S300, the high voltage battery 400 which is charged to store the power output from the one or more fuel cell modules 100 or discharged to supplement the power output from the one or more fuel cell modules 100 is charged to a present second required charge amount based on the number of fuel cell modules 100 determined to require the calibration of the pressure sensor 130 in the monitoring step S100. Then, the fuel cell module 100 determined to require the calibration of the pressure sensor 130 in the monitoring step S100 may stop the power generation at S310.

Prior to the controlling step S300, the method further includes the step of setting the offset calibration sequence of the pressure sensor 130 based on the deviation from the average value of the offset size of the pressure sensor 130 included in the one or more fuel cell modules 100 at S200, In the controlling step S300, the power generation of the fuel cell module 100 determined to require calibration of the pressure sensor 130 may be controlled to be sequentially stopped according to the sequence set in the setting step S310.

Although shown and described with respect to specific embodiments of the present disclosure, it will be obvious to those of ordinary skill in the art that the present disclosure can be variously improved and changed without departing from the technical spirit of the present disclosure provided by the following claims.

The invention claimed is:

1. A system for calibrating an offset of a pressure sensor for a fuel cell, the system comprising:
one or more fuel cell modules in which power generation is individually controlled by independently supplying hydrogen or air to a fuel cell stack, the one or more fuel cell modules each including a pressure sensor to sense a pressure of the hydrogen supplied to the fuel cell stack;
a monitoring unit configured to monitor whether offset calibration of the pressure sensor of the one or more fuel cell modules is required;
a power generation control unit configured to individually control the one or more fuel cell modules to continue or stop power generation; and
a calibration control unit configured to calibrate the offset of the pressure sensor of the fuel cell module in a state where power generation is stopped based on a preset offset calibration period or the monitoring of the monitor unit as to whether calibration is required;
wherein the calibration control unit is configured to calibrate the offset of the pressure sensor using atmospheric pressure as a reference value.

2. The system according to claim 1, wherein the monitoring unit is configured to monitor whether the calibration of the pressure sensor is urgently required based on an output value of the pressure sensor or a power generation state of the fuel cell stack.

3. The system according to claim 2, wherein the pressure sensor included in each of the one or more fuel cell modules includes a plurality of sensors, and the monitoring unit is configured to determine that the calibration of the pressure sensor is required if an error between output values from the plurality of sensors included in the pressure sensor is greater than or equal to a preset error.

4. The system according to claim 2, wherein the monitoring unit is configured to determine that the calibration of the pressure sensor is required if a ratio of a minimum cell voltage to an average cell voltage of the fuel cell stack is less than or equal to a predetermined ratio.

5. The system according to claim 2, wherein the calibration control unit is configured to determine that general calibration is required when the calibration of the pressure sensor is not urgently required through the monitoring unit, and the calibration control unit is configured to calibrate the offset of the pressure sensor when the fuel cell module is normally stopped or shut down.

6. The system according to claim 2, wherein the power generation unit is configured to forcibly stop the power generation of the fuel cell module determined to require urgent calibration of the pressure sensor by the monitoring unit, and
wherein the calibration control unit is configured to calibrate the offset of the pressure sensor of the fuel cell module in which power generation is stopped in the power generation control unit.

7. The system according to claim 1, wherein each of the one or more fuel cell modules includes a low voltage battery which is charged to store a generated power of the fuel cell stack or discharged to supplement the generated power of the fuel cell stack,
and wherein the power generation control unit charges the low voltage battery included in the fuel cell module, which is determined to require the calibration of the pressure sensor by the monitoring unit, to a preset first required charge amount based on a power consumption in a state where the power generation of the fuel cell module is stopped and an amount of power required for restart, and then stops the power generation of the fuel cell module determined to require the calibration of the pressure sensor by the monitoring unit.

8. The system according to claim 1, further comprising a high voltage battery which stores a power output from the one or more fuel cell modules or is discharged to supplement the power output from the one or more fuel cell module,
wherein the power generation control unit charges the high voltage battery to a preset second required charge amount based on a number of the fuel cell module determined to require the calibration of the pressure senor by the monitoring unit, and then stops the power generation of the fuel cell module determined to require the calibration of the pressure sensor by the monitoring unit.

9. The system according to claim 1, wherein the monitoring unit is configured to set an offset calibration sequence of the pressure sensor based on a deviation from an average value of an offset size of the pressure sensor included in the one or more fuel cell modules,
and wherein the power generation control unit sequentially stops the power generation of the fuel cell module determined to require the calibration of the pressure sensor according to the sequence set by the monitoring unit.

10. The system according to claim 1, wherein the monitoring unit is configured to set an offset calibration sequence of the pressure sensor based on an offset sign of the pressure sensor included in the one or more fuel cell modules, and wherein the power generation control unit sequentially stops the power generation of the fuel cell module determined to require the calibration of the pressure sensor according to the sequence set by the monitoring unit.

11. A method for calibrating an offset of a pressure sensor for a fuel cell, the method comprising:
providing at least one fuel cell modules each including a pressure sensor to sense a pressure of hydrogen supplied to a fuel cell stack, and providing a monitoring unit configured to monitor whether an offset calibration of the pressure sensor is required, a power generation control unit configured to control power generation, and a calibration control unit configured to calibrate the offset of the pressure sensor;
monitoring, by the monitoring unit, whether the offset calibration of a pressure sensor is required;
controlling, by the power generation control unit, each of the at least one fuel cell modules to continue or stop the power generation according to the monitoring result; and
calibrating, by the calibration control unit, the offset of the pressure sensor of the fuel cell module in a state where the power generation is stopped based on a preset offset calibration period or whether the calibration is required in the monitoring step;
wherein the calibration control unit us configured to calibrate the offset pressure sensor using atmospheric pressure as a reference value.

12. The method according to claim 11, wherein in the monitoring step, whether the calibration of the pressure sensor is urgently required is monitored based on an output value of the pressure sensor or a power generation state of the fuel cell stack.

13. The method according to claim 12, wherein in the monitoring step, it is determined that the calibration of the pressure sensor is required if an error between output values from a plurality of sensors included in the pressure sensor included in each of the one or more fuel cell modules is greater than or equal to a preset error.

14. The method according to claim 12, wherein in the monitoring step, it is determined that the calibration of the pressure sensor is required if a ratio of a minimum cell voltage to an average cell voltage of the fuel cell stack is less than or equal to a predetermined ratio.

15. The method according to claim 12, wherein in the controlling step, the power generation of the fuel cell module determined to require urgent calibration of the pressure sensor in the monitoring step is controlled to be forcibly stopped, and
in the calibrating step, the offset of the pressure sensor of the fuel cell module in which power generation is stopped in the controlling step is calibrated.

16. The method according to claim 11, wherein each of the one or more fuel cell modules includes a low voltage battery which is charged to store a generated power of the fuel cell stack or discharged to supplement the generated power of the fuel cell stack,
in the controlling step, the low voltage battery included in the fuel cell module, which is determined to require the calibration of the pressure sensor in the monitoring step, is charged to a preset first required charge amount based on a power consumption in a state where the power generation of the fuel cell module is stopped and an amount of power required for restart, and then the power generation of the fuel cell module determined to require the calibration of the pressure sensor in the monitoring step is stopped.

17. The method according to claim 11, wherein in the controlling step, a high voltage battery, which stores a power output from the one or more fuel cell modules or is discharged to supplement the power output from the one or more fuel cell module, is charged to a preset second required charge amount based on a number of the fuel cell module determined to require the calibration of the pressure senor in the monitoring step, and then the power generation of the fuel cell module determined to require the calibration of the pressure sensor in the monitoring unit is stopped.

18. The method according to claim 11, further comprising, before the controlling step, the step of setting an offset calibration sequence of the pressure sensor based on a deviation from an average value of an offset size of the pressure sensor included in the one or more fuel cell modules,
wherein in the controlling step, the power generation of the fuel cell module determined to require the calibration of the pressure sensor is sequentially stopped according to the sequence set in the setting step.

* * * * *